United States Patent [19]

Smith

[11] Patent Number: 4,908,751

[45] Date of Patent: Mar. 13, 1990

[54] PARALLEL DATA PROCESSOR

[76] Inventor: Harry F. Smith, Seven Fern La., Newtown, Conn. 06470

[21] Appl. No.: 108,774

[22] Filed: Oct. 15, 1987

[51] Int. Cl.$^4$ .................. G06F 13/00; G06K 9/56; G06G 9/00

[52] U.S. Cl. .................. 364/200; 382/49; 382/41; 364/822

[58] Field of Search .................. 364/200, 900; 382/41, 382/49, 52

[56] References Cited

U.S. PATENT DOCUMENTS

| | | | |
|---|---|---|---|
| 4,601,055 | 7/1986 | Kent | 382/41 |
| 4,603,398 | 7/1986 | Bocker et al. | 364/845 |
| 4,622,632 | 11/1986 | Tanimoto et al. | 364/200 |
| 4,633,427 | 12/1986 | Bocker | 364/822 |
| 4,635,292 | 1/1987 | Mori et al. | 382/49 |
| 4,639,857 | 1/1987 | McCanny et al. | |
| 4,641,238 | 2/1987 | Kneib | |
| 4,720,780 | 1/1988 | Dolecek | 364/200 |
| 4,736,439 | 4/1988 | May | 382/52 |
| 4,739,474 | 4/1988 | Holsztynski | 364/200 |
| 4,739,476 | 4/1988 | Fiduccia | 364/200 |
| 4,742,552 | 5/1988 | Andrews | 382/49 |
| 4,745,546 | 5/1988 | Grinberg et al. | 364/200 |
| 4,809,348 | 2/1989 | Meyer et al. | 382/49 |
| 4,814,973 | 3/1989 | Hillis | 364/200 |

OTHER PUBLICATIONS

Dick Poutain, "A Personal Transputer", Byte, Jun./88, pp. 303-308.
"Convolution Hardware Accelerates Imaging Tasks" D. MacRae, Electronic System Design Magazine, Jan. 1987, pp. 58-62.
"The Connection Machine" by W. Daniel Hillis, Scientific America, Jun. 1987, pp. 108-115.
"Warp Project Spawning Computers Based on Systolic Processing" by Chappell Brown, Electronic Engineering Times, Jun. 1, 1987, pp. 33,36.
Device Specification: AM95c85 Content Addressable Data Manager, 9/85.
Product Specification "The Transputer Family" Inmos Corp., 6/86, 3/86.

Primary Examiner—Andrew J. James
Assistant Examiner—Viet Q. Nguyen

[57] ABSTRACT

A data processing system for simultaneously processing a plurality of data words, comprising one or more data processing planes each of which comprises a plurality of processing entities logically organized as rows and columns as a two dimensional array of processing entities, each of the processing entities being operable for performing arithmetic and logical operations on data words in a substantially simultaneous manner with others of the processing entities. Substantially all of the processing entities are operatively coupled to at least one other processing entity in an immediately adjacent row or column for transferring data therebetween and are also further operatively coupled to at least one other processing entity in a nonadjacent row or column for transferring data therebetween.

20 Claims, 9 Drawing Sheets

LEGEND FOR ITERATION 1
!= 0  "= .84  #= .841  $= .85  %= .8610001
&= .8710001  '= .861  (= .9592001  )= .9801  *= .871
+= .9812  ,= 1.0131  -= .9823  .= 1.0142  /= .862
0= .842  1= .872  2= .9922  3= .892  4= .872
5= .9933  6= 1.0153  7= 1.0054  8= 1.0164  WN= .1
WF= .01
BACKGROUND INTENSITY= 1
OBJECT INTENSITY= 1.1

FIG.5

LEGEND FOR ITERATION 1
!= 0  "= .8  #= .81  $= .8200001  %= .83
&= .82  '= .9130001  (= .9350001  )= .83  *= .968
+= .946  ,= .85  -= .957  WN= .1
WF= 0
BACKGROUND INTENSITY= 1
OBJECT INTENSITY= 1.1

```
! ! ! ! ! ! ! ! ! ! ! ! ! ! ! ! ! ! ! ! ! ! ! ! ! ! ! ! ! !
! ! ! ! ! ! ! ! ! ! ! ! ! ! ! ! ! ! ! ! ! ! ! ! ! ! ! ! ! !
! ! " # $ $ $ $ $ $ $ $ % & ' ( ' & % $ $ $ $ $ $ $ $ # " ! !
! ! # ) * * * * * * * + , - . / . - , + * * * * * * * ) # ! !
! ! $ * 0 0 0 0 0 1 2 3 4 5 6 5 4 3         0 0 0 0 0 * $ ! !
! ! $ * 0 1 1 1 0 1 8 9 : ; < ; :           0 0 0 0 * $ ! !
! ! $ * = 2 8 2 = 1 8 > ? ə A ə ?  ⤺A        0 0 0 0 * $ ! !
! ! $ C D 3 E 3 F G H I J K L K J    B       0 0 0 0 * $ ! !
! ! P , Q R S T U V W X Y Z [ Z Y            0 0 0 0 * $ ! !
! ! ] ^ 4 5 _ ' a b c d e f g f e h       D j 0 0 0 * $ ! !
! ! k l : m n o p q r s t u v u t w x y z Q D = 0 0 * $ ! !
! ! k ( ¡ } ~ ç ū f é f u ā ä ā u ä á ç 5 ē 3 7 1 0 * $ ! !
! ! k ( ë ė I ĩ ì g ä g v A É Â v æ Æ < 6 ō ō 8 1 0 * $ ! !
! ! k ( ¡ } ò Ç û f é f u ā ä ā u ā á ç 5 ē 3 7 1 0 * $ ! !
! ! k l : ù n ý p q r s t u v ö t w x y z Q D = 0 0 * $ ! !
! ! ] ^ 4 5 _ ' a b c d e f g f e h X ì 3 D j 0 0 0 * $ ! !
! ! P , Q R S T U V W X Y Ū L Ū Y X \ H 2 = 0 0 0 0 * $ ! !
! ! $ C D 3 ¢ 3 F G H I £ ¥ A ¥ £ M N O 1 0 0 0 0 0 * $ ! !
! ! $ * = 2 8 2 = 1 8 9 : ç < ç : 9 8 1 0 0 0 0 0 0 * $ ! !
! ! $ * 0 1 1 1 0 1 2 3 4 5 6 5 4 3 7 1 0 0 0 0 0 0 * $ ! !
! ! $ * 0 0 0 0 0 0 = D Q R S R Q D = 0 0 0 0 0 0 0 * $ ! !
! ! $ * 0 0 0 0 0 0 0 j D 3 ¢ 3 D j 0 0 0 0 0 0 0 0 * $ ! !
! ! $ * 0 0 0 0 0 0 0 0 = 2 8 2 = 0 0 0 0 0 0 0 0 0 * $ ! !
! ! $ * 0 0 0 0 0 0 0 0 0 1 1 1 0 0 0 0 0 0 0 0 0 0 * $ ! !
! ! $ * 0 0 0 0 0 0 0 0 0 0 0 0 0 0 0 0 0 0 0 0 0 0 * $ ! !
! ! $ * 0 0 0 0 0 0 0 0 0 0 0 0 0 0 0 0 0 0 0 0 0 0 * $ ! !
! ! # ) * * * * * * * * * * * * * * * * * * * * * * ) # ! !
! ! " # $ $ $ $ $ $ $ $ $ $ $ $ $ $ $ $ $ $ $ $ $ $ # " ! !
! ! ! ! ! ! ! ! ! ! ! ! ! ! ! ! ! ! ! ! ! ! ! ! ! ! ! ! ! !
! ! ! ! ! ! ! ! ! ! ! ! ! ! ! ! ! ! ! ! ! ! ! ! ! ! ! ! ! !
```

LEGEND FOR ITERATION 2
!= 0   "= 1.749888   #= 2.878848   $= 2.907073   %= 2.913859
&= 2.929315   '= 2.959184   (= 2.967943   )= 4.572289   *= 4.600513
+= 4.601521   ,= 4.622756   -= 4.826871   .= 5.067396   /= 5.261139
0= 4.628737   1= 4.62877   2= 4.630786   3= 4.683603   4= 5.098139
5= 5.948536   6= 6.380971   7= 4.630786   8= 4.631794   9= 4.699163
:= 5.316609   ;= 6.449493   <= 7.139976   == 4.629745   >= 4.705964
?= 5.34097   ə= 6.519709   A= 7.22674   B= 4.705965   C= 4.6073
D= 4.65098   E= 4.692364   F= 4.651013   G= 4.635592   H= 4.631828
I= 4.705998   J= 5.342158   K= 6.522474   L= 7.23109   M= 4.705999
N= 4.631827   O= 4.628804   P= 2.90808   Q= 4.855432   R= 5.097049
S= 5.291136   T= 5.098143   U= 4.857523   V= 4.654071   W= 4.63586
X= 4.709052   Y= 5.344318   Z= 6.52382   [= 7.231137   \= 4.634852
]= 2.909122   ^= 4.654639   _= 6.39022   '= 5.97578   a= 5.156805
b= 4.754426   c= 4.711121   d= 4.776834   e= 5.402228   f= 6.551093
g= 7.250951   h= 4.776799   i= 4.699198   j= 4.635524   k= 2.91013
l= 4.6702   m= 6.450864   n= 7.172276   o= 6.743219   p= 5.833296
q= 5.394951   r= 5.346515   s= 5.402266   t= 5.860054   u= 6.819382
v= 7.295852   w= 5.402229   x= 5.343167   y= 5.316646   z= 5.098139
{= 4.677   |= 5.34101   }= 6.522522   ~= 7.305676   Ç= 7.129242
Ü= 6.817968   é= 6.52512   ā= 7.135135   ä= 7.389494   à= 6.551047
å= 6.521009   ç= 6.449493   ē= 5.097048   ë= 5.342162   è= 6.526624
Ï= 7.322675   î= 7.384919   ì= 7.295805   Ä= 7.231138   Å= 7.389494
É= 7.414878   æ= 7.250904   Æ= 7.22674   ô= 5.291135   ö= 4.692363
ò= 7.305676   û= 6.817969   ù= 6.450864   ÿ= 6.743219   ö= 6.819382
Ü= 6.523774   ¢= 4.692363   £= 5.341006   ¥= 6.519708   WN= .1
WF= .01                                    BACKGROUND INTENSITY= 1
                                           OBJECT INTENSITY= 1.1

LEGEND FOR ITERATION 2
!= 0  "= 1.536  #= 2.56  $= 2.5664  %= 2.579201
&= 2.5984  '= 2.604801  (= 4.096  )= 4.1152  *= 4.299423
+= 4.51046  ,= 4.68521  -= 4.1344  .= 4.510459  /= 5.265126
0= 5.669747  1= 4.510459  2= 4.1472  3= 4.707254  4= 5.721406
5= 6.362393  6= 4.1536  7= 4.729299  8= 5.773065  9= 6.427985
:= 4.1024  ;= 4.115201  <= 4.140801  == 5.67849  >= 5.288617
?= 4.551476  @= 4.1856  A= 4.204801  B= 4.771321  C= 5.797702
D= 6.446725  E= 4.147201  F= 6.390503  G= 5.985362  H= 5.163708
I= 4.764433  J= 4.729299  K= 4.771322  L= 5.186828  M= 6.038243
N= 6.484206  O= 4.707254  P= 6.312698  Q= 6.540427  R= 5.721407
S= 6.493577  T= 6.484206  U= 6.446726  V= 6.446725  W= 6.484207
X= 6.559168  Y= 5.669748  Z= 4.685209  [= 5.265126  \= 4.707254
]= 5.288618  WN= .1
WF= 0
BACKGROUND INTENSITY= 1
OBJECT INTENSITY= 1.1

FIG.8

```
LEGEND FOR ITERATION 1
!= 0  "= 20  #= 19.5122  $= 20.25  %= 20.2439
&= 21.7381  '= 22.80488  (= 21.7381  )= 22.26191  *= 23.60975
+= 22.26191  ,= 21.74419  -= 23.04762  .= 19.52381  /= 19.04762
0= 19.04762  1= 19.76191  2= 19.7619  3= 22.52381  4= 20.2381
5= 19.76191  6= 20.2381  7= 22  8= 22.51163  9= 21.75
:= 22  ;= 23.04762  WN= .1
WF= .01
BACKGROUND INTENSITY= 1
OBJECT INTENSITY= 1.1
```

FIG.9

PARALLEL DATA PROCESSOR

CROSS REFERENCE TO RELATED APPLICATIONS

This application is related to a copending application Ser. No.: 07/031,035, filed Mar. 27, 1987, entitled "Minimal Connectivity Data processing System", the disclosure of which is incorporated herein in its entirety.

FIELD OF THE INVENTION

This application relate generally to digital data processing systems and, in particular, relates to a highly parallel digital data processing system wherein individual processing entities (PEs) within a two dimensional processing array (PA) of PEs are each coupled to at least one logically adjacent PE and also to at least one logically nonadjacent PE.

BACKGROUND OF THE INVENTION

Parallel digital data processing systems are advantageously employed for those computing applications wherein a large amount of data must be analyzed in a relatively short interval of time. By allocating a plurality of data processing elements, such as microprocessors, to simultaneously process the data substantial processing speed improvements are achieved over a traditional single instruction stream, single data stream data processor. Applications where such parallel data processing systems are most beneficial include seismic, meteorologic and imaging applications.

In an imaging application, for example, image pixel data from a large number of sensors may need to be analyzed in accordance with a preefined algorithm to determine desired features of an object. These features may include the object outline relative to a background, the center of an object and other similar object related criteria. As can be appreciated, if such imaging occurs in a real time manner a large amount of data may need to be processed in an internal of time related to the image acquisition rate, which may be 1/50 or 1/60 of a second if television frame rates are required.

Thus, it can be realized that if a parallel data processing system is to analyze such image pixel data that the physical interconnection between individual PEs of a PA is an important consideration. Inasmuch as image pixel data being analyzed by a given PE may also, depending on the algorithm employed, affect the processing results of other PEs the interchange of image pixel data among PEs must be accomplished in a rapid and efficient manner.

Furthermore, if it is desired to simulate certain properties of neural visual systems the interconnection between PEs may be of critical concern. It is known that individual neurons of the retina and subretinal structures are synaptically coupled not only to adjacent neurons but also to neurons which are spatially removed from a given neuron. These populations of spatially removed neurons may be in the same layer of neural structure or within another layer. This distributed nature of the neural synapse is believed to greatly contribute to the effectiveness of biological visual systems. Thus, any imaging system which simulates such neural visual structures must take into account this feature of distributed synaptic connectivity between neurons in order to accurately model the operation of such visual structures.

SUMMARY OF THE INVENTION

In accordance with the invention there is disclosed a data processing system for simultaneously processing a plurality of data words, comprising one or more data processing planes each of which comprises a plurality of processing entities logically organized as rows and columns as a two dimensional array of processing entities, each of the processing entities being operable for performing arithmetic and logical operations on data words in a substantially simultaneous manner with others of the processing entities. Substantially all of the processing entities are operatively coupled to at least one other processing entity in an immediately logically adjacent row or column for transferring data therebetween and are also further operatively coupled to at least one other processing entity in a logically nonadjacent row or column for transferring data therebetween. Each of the processing entities within the array may be further coupled to a processing entity or entities in logically adjacent and nonadjacent planes of processing entities, whereby calculated results may be transferred thereto and data received therefrom, the received data relating to, for example, revised image pixel weighting data in a parallel data processing system wherein energy received from an environment is detected by an array of energy sensors. In such a system the sensors output a data word expressive of a characteristic of the received energy, such as intensity. The sensor output signals are received by corresponding processing entities in a first, sensor data receiving plane. Each of the receiving processing entities may transfer to and receive data from logically adjacent and nonadjacent processing entities, the data being expressive of respective received intensity values modified by an appropriate adjacent or nonadjacent weighting factor. A system constructed in accordance with the invention is shown to be advantageous for modelling certain biological systems, such as visual systems.

BRIEF DESCRIPTION OF THE DRAWING

The foregoing features of the present invention will be more fully described hereinafter in the Detailed Description of the Invention read in conjunction with the Drawing wherein:

FIGS. 3, 3a, 3b and 3c is a block diagram showing one of the processing entities 4;

FIGS. 4, 5, 6, 7 and 8 are graphs showing illustrative imaging results made possible by the teaching of the invention.

DETAILED DESCRIPTION OF THE INVENTION

Figure 1:
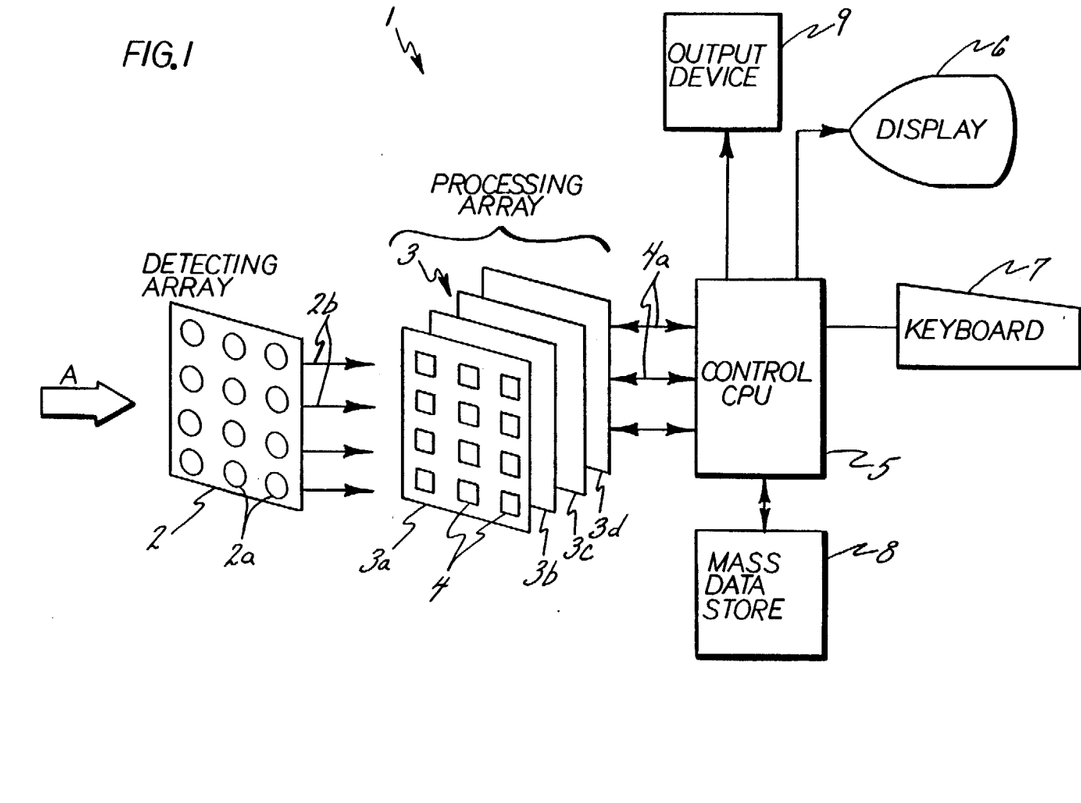
FIG. 1 is a block diagram of an imaging system 1 comprised of a radiation detecting array 2, a processing array 3 and a control CPU 5.

Referring now to FIG. 1 there is shown in block diagram form a digital data processing system 1 having an array of energy detectors 2a. Array 2 is disposed for receiving incident energy, indicated by the letter A, from an environment viewed by each of the detectors. The incident energy may be electromagnetic, thermal or acoustic energy. Each of the detectors 2a are selected for converting the particular type of energy received into a signal 2b having a magnitude which is a function of intensity, frequency, or some other characteristic of the energy. The array 2 may comprise a two dimensional array of detectors organized as rows and columns, although other array topologies are within the scope of the teaching of the invention. The total number of detectors 2a may be arbitrarily large, such as an array of 1024 or even greater.

Each of the signals 2b is coupled to at least one plane of a processing array (PA) 3, the array 3 being comprised of one or more logical planes, such as the planes 3a–d. Each of the planes, such as the plane 3a, is comprised of a plurality of processing entities (PEs) 4.

Figure 2:
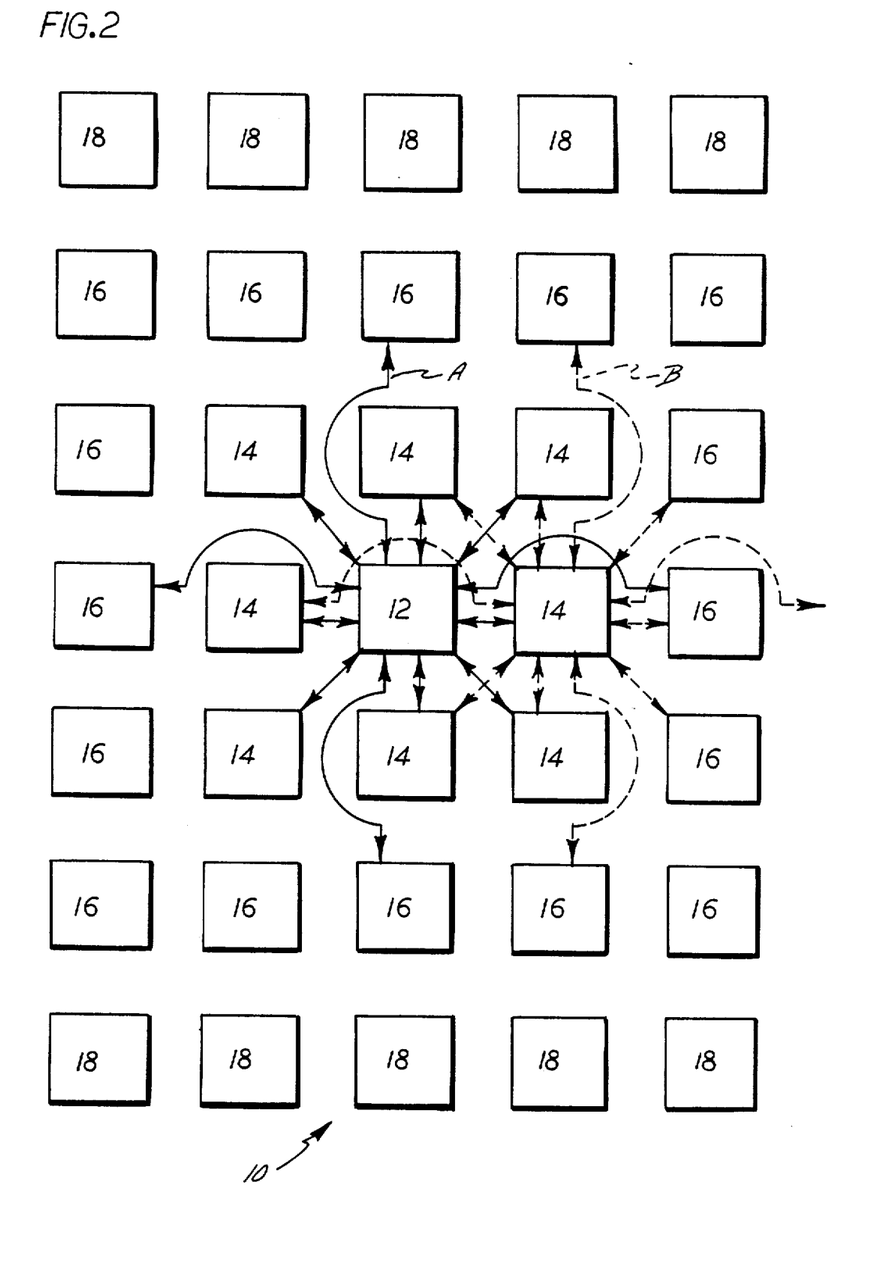
FIG. 2 is a block diagram of one plane 3a of processing array 3 showing the connectivity of the processing entities 4 contained thereon.
Figure 3:
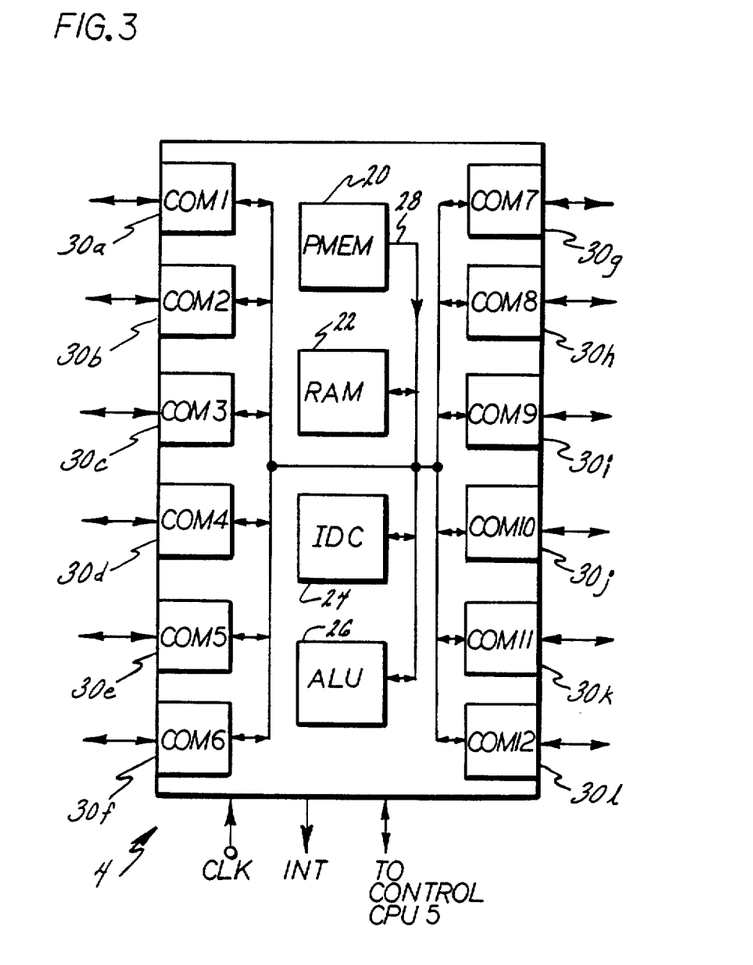

Referring to FIG. 3 there is shown one possible embodiment of one of the plurality of PEs 4 wherein it can be seen that the PE is a single-chip type of microprocessor device having internal program memory (PMEM) 20, random access memory (RAM) 22, instruction decode and control (IDC) logic 24 and an arithmetic/logic unit (ALU) 26 coupled together by a data bus 28. The PE 4 may also comprise a plurality of communications (COM1–COM12) ports 30a–30l for coupling the PE to other adjacent and nonadjacent PEs in the manner depicted in FIG. 2. The PE 4 may also be provided with one or more clock (CLK) inputs, such as a clock for timing the operation of the IDC 24 and a communications clock if the COM ports 30a–30l are synchronous or asynchronous serial data communication devices. The PE 4 may also have an interrupt output (INT) coupled to a control CPU 5 and a control bus (CONTBUS) coupled to the CPU 5, such as a parallel data bus or a serial or a three wire handshaking bus, as disclosed in copending application Ser. No. 07/031,035. CONTBUS may also comprise a control signal line coupled in common to others of the PEs 4 in the plane and being operable for indicating to the CPU 5 a processing state common to all of the PEs 4 within the plane, such as a processing state which indicates to the CPU 5 the completion of a given processing task. The operation of such a common control signal line is also fully disclosed in copending application Ser. No. 07/031,035.

The PE 4 may be a commercially available microprocessor or a custom designed device having characteristics specially adapted for an intended application. For example, PE 4 may be a reduced instruction set computer (RISC) having augmented I/0 co;xmunications capabilities. The particular algorithms to be performed by the PE 4, such as the communication algorithm and image processing algorithms which are described hereinafter may be permanently programmed into PMEM 20. Temporary data, such as data received from other PEs within the plane and also dynamically variable data such as image weighting values may be stored within RAM 22. PE 4 may also be provided with direct memory access (DMA) capabilities for directly transferring data to and from the COM ports and the RAM.

Referring once more to FIG. 1 it should be appreciated that in some embodiments of the invention each of the planes 3a–d may be a printed circuit board having conductive pathways formed thereon for in&erconnecting each of the PEs one to another, in a manner which will be described below, and also conductors for routing power, clock signals and other signals to the PEs. These other signals may include digital data and control signals 4a from the Control CPU 5. CPU 5 may be, for example, another microprocessor device, a personal type computer or a mainframe computer. In general, CPU 5 may be any type of data processing device which is operable for serving as both a controller and communications front end for the PA 3. Therefore, CPU 5 may be coupled in a well known fashion to an operator display 6, a keyboard 7 and a mass data storage unit 8. CPU 5 may also be coupled to an output device 9 which, depending on the particular application, may be physically translated in accordance with calculations performed by the array 3. For example, in a robotics system information relating to the immediate environment may be received by detecting array 2 which is processed by processing array 3 for controlling the movement of a robot arm, the arm being the output device 9. In such an application only the CPU 5 may need to be aware of the programs necessary to control the device 9, the control being based on the environmental data received and processed by arrays 2 and 3. In general, CPU 5 operates to initiate and monitor the processing of data by the array 3, receive processed data therefrom, and to input control and other data thereto.

Referring now to FIG. 2 there is shown in block diagram form a portion of a typical processing plane 10 of the PA 3 of FIG. 1. As can be seen, each of the PEs may be arranged in a regular array organized by rows and columns. In the view of FIG. 2 one of the PEs has been assigned the numeral 12. The solid arrows designated as A show one possible interconnection scheme, or topology, in accordance with the invention, for connecting the PE 12 to other PEs, whereby PE 12 is coupled to eight logically adjacent PEs (designated as 14) and also to four logically nonadjacent PEs (designated as 16).

It should be noted that the two dimensional array depicted in FIG. 2 is understood to be a logical two dimensional array, that is, the actual physical placement of the PEs may not correspond to their logical location within the array, although in many applications if the physical and logical positions coincide the physical interconnection of PEs is facilitated. This is also true for a plane of PEs, it being understood that a plane is considered to be a logical plane which may or may not correspond to a physical plane. For example, if a large rumber of PEs are required for a particular plane the physical constraints may require that two or more printed circuit cards be utilized. If this is true then it can be realized that the rows and columns of PEs of the plane may not be physically disposed in such fashion, although the interconnection between PEs may be considered, in a logical sense, to form a regular two dimension array.

The nature of the connection between PEs may be that of a bidirectional asynchronous or a synchronous bit serial data communication link, such as a well known RS-232 or RS-422 communications link. Other data communications methods may also be employed, such as a three wire handshaking method disclosed in copending application Ser. No. 07/031,035. Of course, a parallel data bus may also interconnect each of the PEs, or any suitable data communication method whereby each of the PEs may transmit to and receive data from another PE. The actual choice of communication method may depend on system cost constraints, the number of device terminals or pins which are technologically feasible for a PE, the amount of data which must be transferred between PEs and other such criteria.

The dashed arrows designated as B in FIG. 2 illustrate that another PE immediately to the right of PE 12 is interconnected to logically adjacent and nonadjacent PEs in an identical fashion, it being realized that each of the PEs in a given plane may be so interconnected.

It should also be realized that the particular interconnection scheme shown in FIG. 2 is illustrative only in that each PE may be interconnected to, for example, four immediately adjacent PEs and also to 16 nonadjacent PEs. Such an interconnection topology may result in the PE 12 of FIG. 2 being coupled to the PEs 14 which lie to the top, right, bottom and left of PE 12 and also to all of the PEs 16. Similarly, the PE 12 may be so interconnected and also connected to one or more of the PEs 18.

In general, the teaching of the invention may be practiced by connecting a given PE in a logical two dimensional array of PEs to one or more logically immediately adjacent PEs and also to at least one PE which is not logically immediately adjacent. The advantages to be realized by such an interconnection scheme will now be described in relation to an imaging application wherein each of the PEs is coupled to other PEs within a logical plane in the manner shown in FIG. 2. The advantages made possible by the invention may also realized in a number of other parallel processing applications, particularly in those applications where a plurality of data words to be processed have a relationship therebetween which may be physically mapped onto a two dimensional array or a three dimensional array of processing elements and wherein the connectivity between processing elements correlates in part to the relationship between data words.

Figure 4:
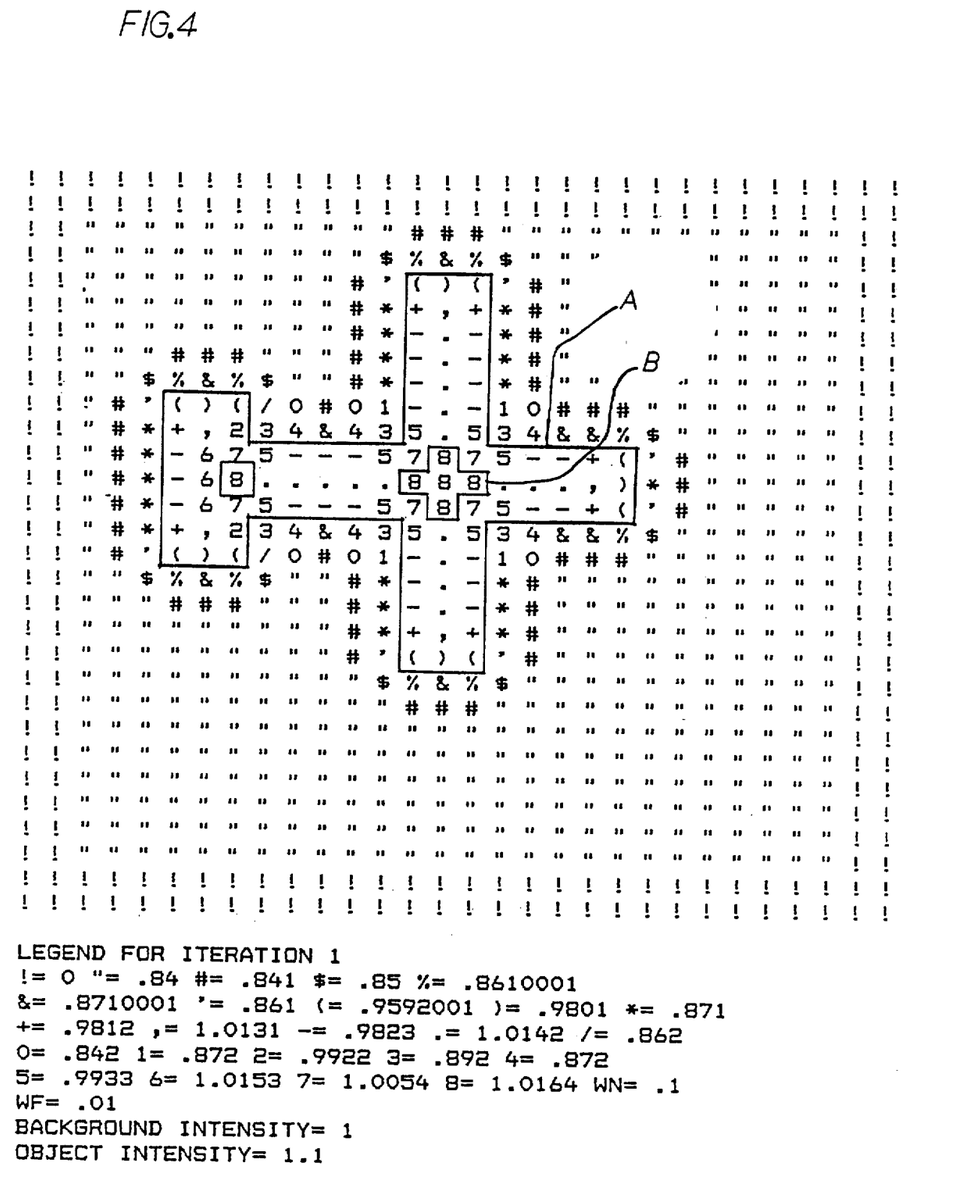
Figure 5:
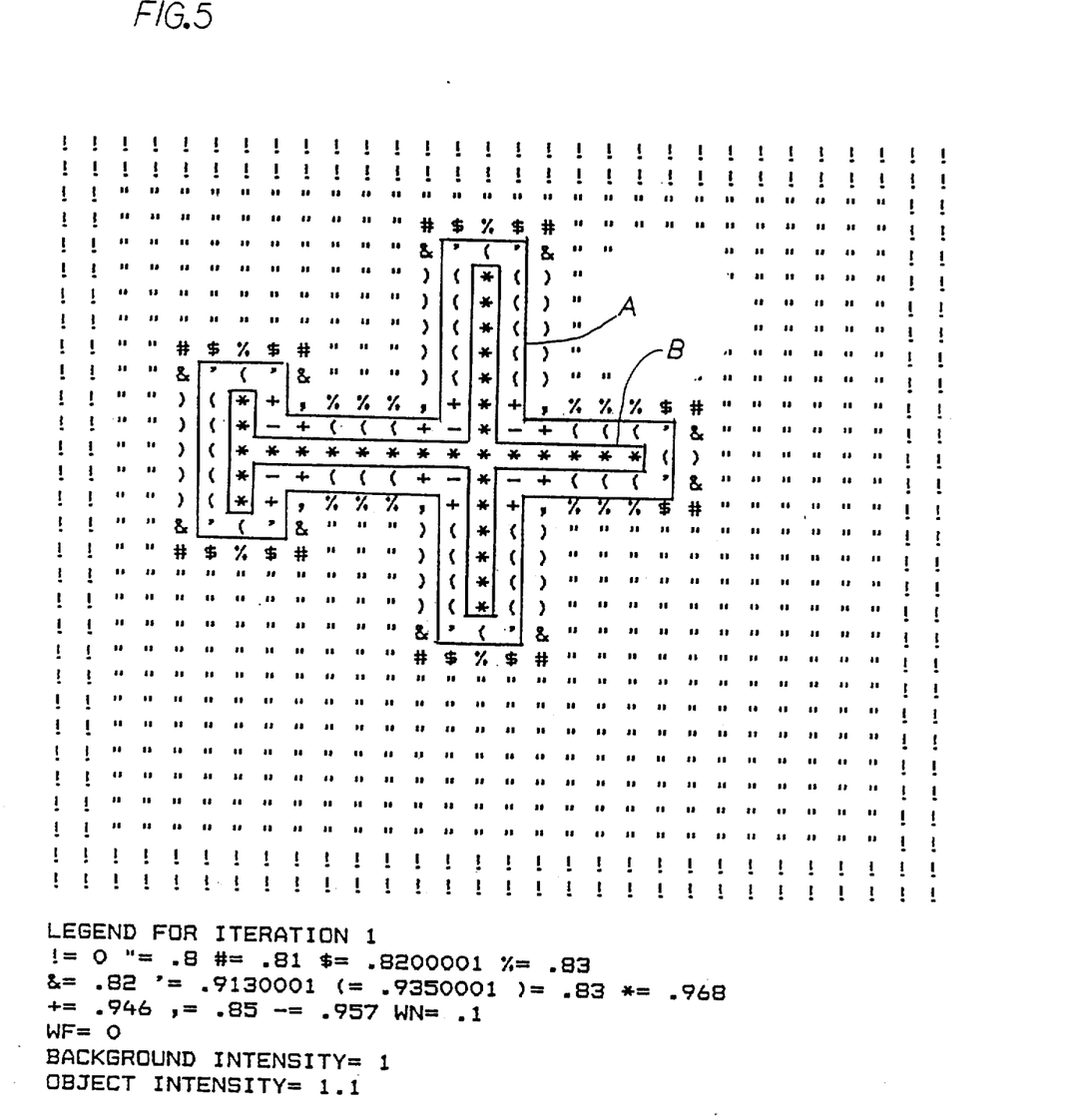

Referring now to FIGS. 4 and 5 there is shown in graphical form the output of a computer program written in the BASIC language which illustrates the operation of the invention. The instruction listing for this BASIC program is set forth immediately following the Detailed Description of the Invention as Appendix A.

Referring first to FIG. 4 there is shown a two dimensional array of data points plotted as alphanumeric characters, the array comprising I×J rows and columns where I and J are both equal to 30. The legend appearing beneath the array of characters illustrates the numeric values associated with each of the alphanumeric characters. Each of the points of the array is representative of a specific energy detector and also a specific PE coupled to the output of a corresponding energy detector. The object having a solid outline and indicated as A was initially inputted into the program by specifying array coordinates at lines 510–670. The program operates to set a desired background radiation intensity level for each of the points of the array, the particular object shape thereafter being inputted and having an intensity level which differs from the background intensity level. As can be seen, the background intensity level has been set to a value of 1.0 while the object intensity level has been set to a value of 1.1. This entering into the program of background intensity and object shape and intensity corresponds to the reception of incident energy from an environment viewed by the detectors.

Each of the PEs within an array receives an intensity value from an associated detector. Each of the PEs also has, by example, two intensity value weighting factors associated therewith. A first weighting factor (WN) is a weighting factor associated with those PEs which are immediately logically adjacent to a given PE. A second weighting factor (WF) is associated with logically nonadjacent PEs. In accordance with the invention each of the PEs computes a modified received intensity value which is a function of both the WN and WF weighting factors and the received intensity values of predetermined logically adjacent and logically nonadjacent PEs, respectively. That is, each of the PEs modifies its respective received intensity value by an amount related to the weighted intensity values of logically immediately adjacent PEs and nonadjacent PEs.

A calculated intensity value (ICALC) for each PE is computed at line 1100 of the program. ICALC is computed from the intensity value received from an associated detector multiplied by the summation (INEAR) of the weighted intensity values of logically adjacent PEs plus the summation (IFAR) of the weighted intensity values of logically nonadjacent PEs. The values of INEAR and IFAR at line 1100 are determined at lines 1000 through 1060 where it can be seen that the value of INEAR is computed by first multiplying the weighting factor WN times the intensity value received by each of the immediately adjacent PEs. Thus, the value of INEAR used at line 1100 to compute ICALC is a summation of the intensity values received by each of the immediately adjacent PEs multiplied by the value of the weighting factor WN. Similarly, the value of IFAR utilized at line 1100 is the summation of the far weighting factor WF multiplied by the received intensity value of four logically nonadjacent PEs.

When the values of ICALC are plotted as in FIG. 4 it can be seen that the maximum calculated intensity values calculated by the array of PEs are plotted as the character 8 as indicated by the outline having the letter B associated therewith.

In FIG. 5 there is illustrated the plotted values of ICALC wherein the value of WF was initially set to 0, thereby effectively causing the calculation of ICALC to ignore the intensity values associated with nonadjacent PEs. As can be seen in FIG. 5, the maximum intensity values are associated with the character * as indicated by the solid outline having the letter B associated therewith. Comparing FIG. 4 to FIG. 5 it can be seen that after one iteration, or calculation of the value of ICALC, FIG. 4 illustrates that a significantly fewer number of maximum values of ICALC have been computed. Furthermore, these maximum value points are clustered, with the exception of one point, at approximately the center of the object. In FIG. 5, the maximum value points are distributed linearly along the major axes of the object A. It can be appreciated that if it were desired for a given application to locate a central point of an object in a rapid manner that the technique of FIG. 4 would yield a more satisfactory result than the technique of FIG. 5. As has been previously stated, the graph of FIG. 4 illustrates the effect of considering the nonadjacent intensity values whereas the graph of FIG. 5 utilizes only intensity values associated with the immediately adjacent PEs.

Figure 7:
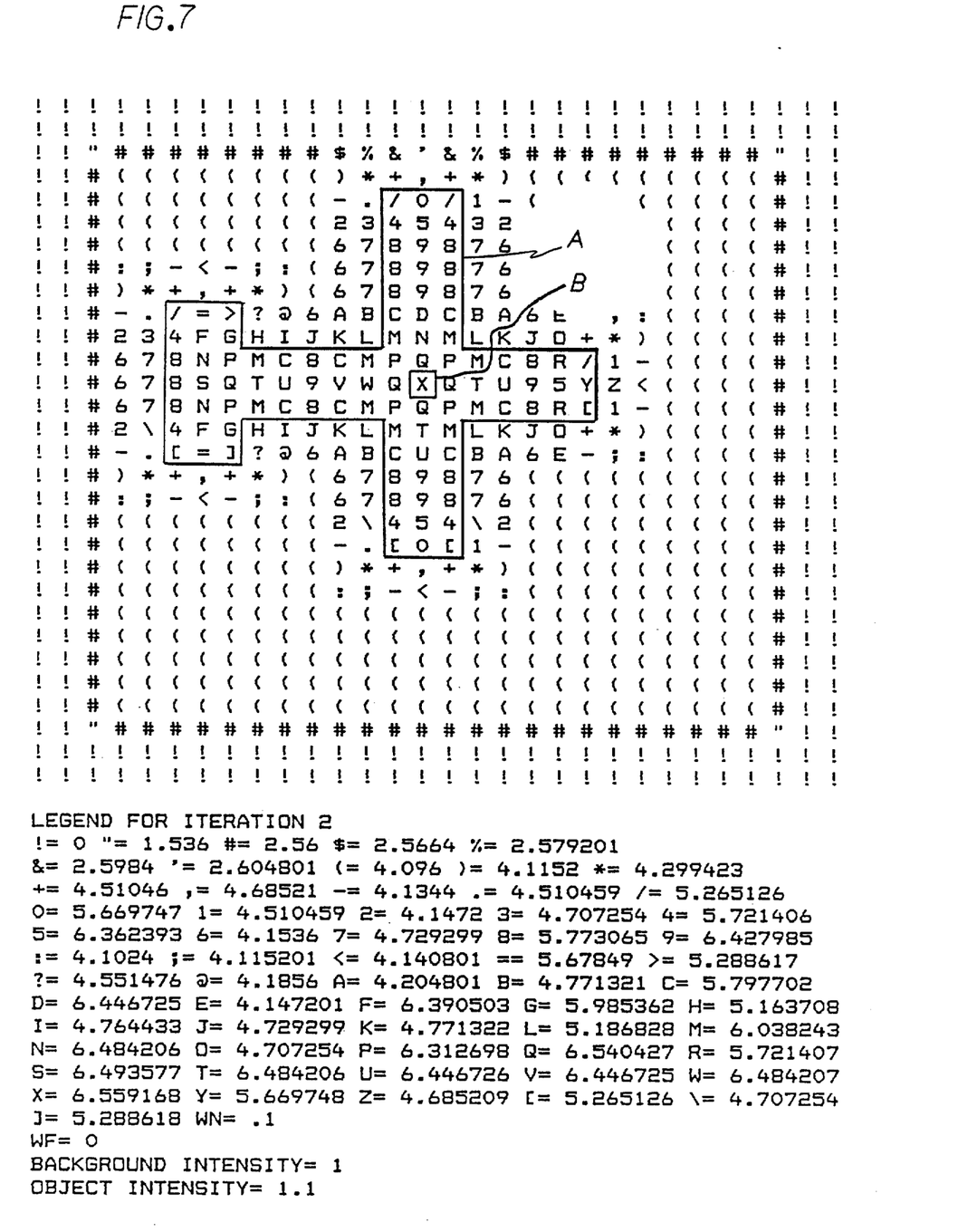

FIGS. 6 and 7 illustrate the results of a still further iteration of the values obtained in FIGS. 4 and 5, respectively. That is, FIG. 6 illustrates the results of a second iteration wherein the intensity value associated with each PE is taken to be ICALC from the previous iteration. It can be seen in FIGS. 6 and 7 that a single maximum intensity value is located at the intersection of the two major axes of the object. Thus, after two iterations, and for the particular method of calculating ICALC utilized, both procedures result in determining a centrally located point of the object to a resolution of one pixel. However, if it is desired to locate such a central point in a rapid manner, a second iteration may not be feasible. Therefore, it can be clearly be seen that the single iteration using data from nonadjacent PEs of FIG. 4 yields superior results to the technique illustrated in FIG. 5.

It should be noted at this time that the program of Appendix A merely models the operation of a parallel plane of PEs interconnected in accordance with the invention. That is, the iterative calculation of ICALC at line 1100 is actually accomplished in a simultaneous manner by each of the PEs within the plane. Similarly, the calculation of INEAR and IFAR is accomplished in a substantially simultaneous fashion by each of the PEs by the PEs transmitting their received intensity value to those logically adjacent and nonadjacent PEs coupled thereto.

At the completion of one iteration the calculated intensity values from each of the PEs may be read out by the control CPU 5 of FIG. 1 whereby the PE or PEs having a maximum intensity value may be determined. Based on this determination CPU 5 may actuate output device 9, such as by activating device 9 to move within a coordinate frame related to the energy values received and computed. For example, CPU 5 may cause device 9 to be directed to the object at a point corresponding to the locus of maximum intensity values.

As has been previously stated the program listing shown herein is illustrative only, it being realized that in a parallel processing system constructed in accordance with the invention that each PE within a plane computes the value of ICALC in a simultaneous fashion with other PEs. Thus, the time for one iteration is essentially the the time required for one calculation of ICALC to occur as opposed to the method illustrated in the program, where ICALC is repetitively calculated for each PE of the array. In this regard, the transmission of intensity values between PEs may be accomplished in at least two manners. In one embodiment, each of the PEs transmits the value of the intensity received to adjacent and nonadjacent PEs, the receiving PE therefore being responsible for modifying the received intensity value by either WN or WF. In another embodiment, each PE modifies its received intensity value before transmitting the value. Both embodiments imply that a given PE be apprised of the connectivity of a given communication port, that is, whether the port is coupled to an adjacent or a nonadjacent PE. The second embodiment, however, has the advantage of requiring fewer calculations by each PE inasmuch as the received intensity values are already properly modified by the appropriate weighting factors. The second embodiment also readily accommodates different values of WN or WF to be spatially distributed over a given plane.

In other embodiments of the invention each of the PEs within the plane 3a illustrated in FIG. 2 may be further coupled to one or more PEs in another plane, such as the plane 3b of FIG. 1. Thus, at the completion of the first iteration each of the PEs in plane 3a may transmit its calculated intensity value to a PE in another plane and, subsequently, receive updated intensity information from detecting array 2, whereby the PEs of array 3a are enabled to once more compute a new value of ICALC based on the updated intensity information. The PEs in the array 3b may simultaneously calculate other information based on the calculated intensity values previously received from plane 3a.

Figure 9:
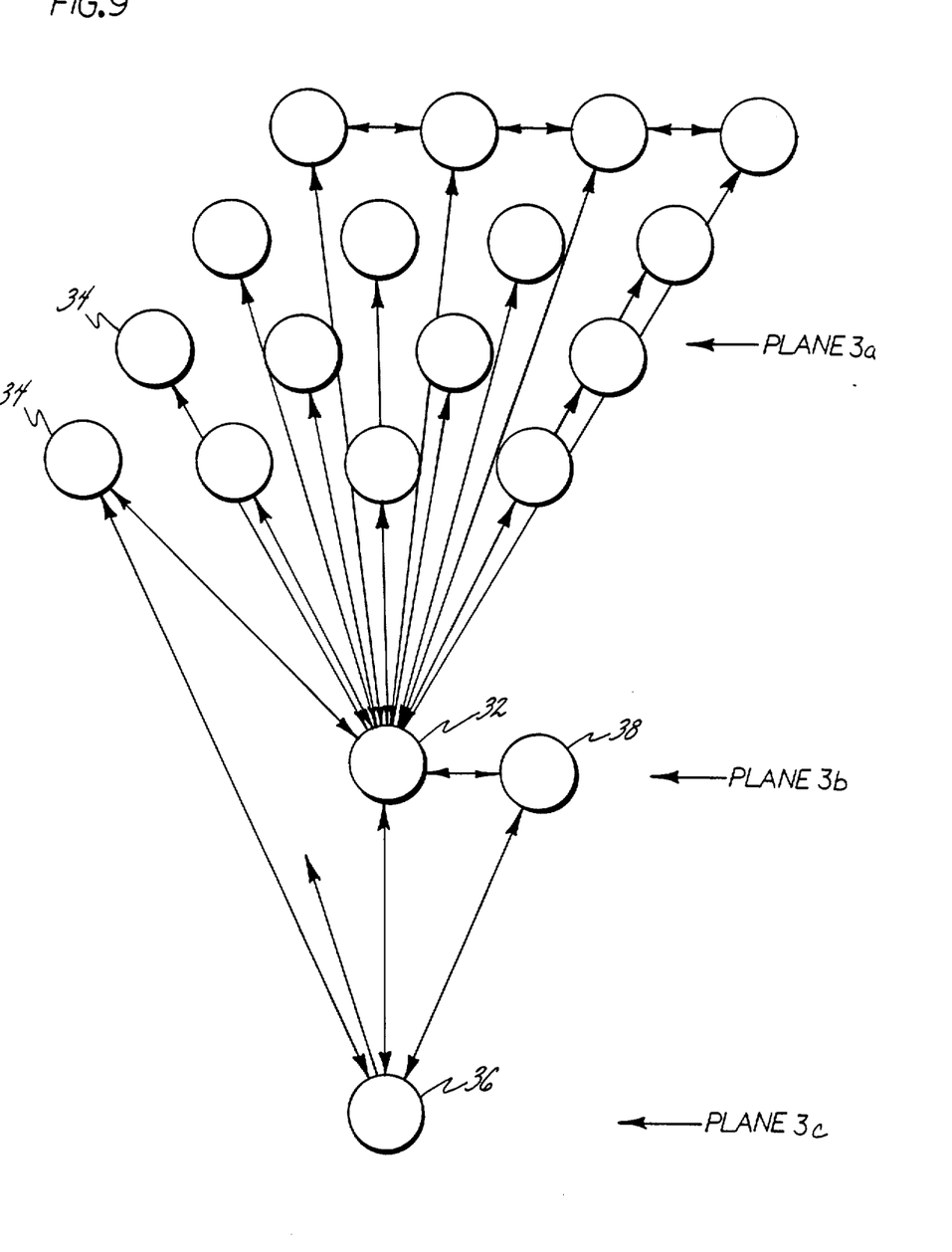
FIG. 9 is a block diagram showing the connectivity between PEs in logically adjacent and nonadjacent planes.

For example and as shown in FIG. 9, groups of PEs in plane 3a, such as a 4×4 group of PEs 34, may each be coupled to a single PE 32 in the plane 3b. The PE 32 so coupled in array 3b may then, for example, average the calculated intensity values received. The PE 3 in plane 3b may be similarly coupled to a 4×4 group of PEs (not shown) in plane 3a and also to the PE 32 and other PEs in plane 3b. Thus, a reduced number of PEs in an underlying plane may be employed to determine a region or regions of the scene having a maximum intensity value associated therewith. This spatially averaged intensity may thereafter be transmitted to still yet another PE 36 in plane 3c for further processing or may be read out by CPU 5.

It can thus be realized that if a successive number of planes of PEs are so coupled together that a PE in a given plane may be coupled to a PE or PEs in immediately adjacent planes, and, in accordance with the invention, also be coupled to a PE or PEs in nonadjacent planes. As can be seen in FIG. 9 PE 36 is coupled to both a PE 32 and also to the PEs 34. Based upon calculation results received by each of the PEs 32 and 36 adjusted weighting values and other data may be fed back to PEs 34, thereby adjusting the calculations of PEs in logically adjacent and nonadjacent planes in order to optimize a desired result. Thus, a three dimensional structuring of the processing array 3 is achieved whereby each PE is apprised of information relating to not only logically immediately adjacent and nonadjacent PEs in the same plane but also may be apprised of information relating to PEs in logically adjacent and in nonadjacent planes.

Figure 8:
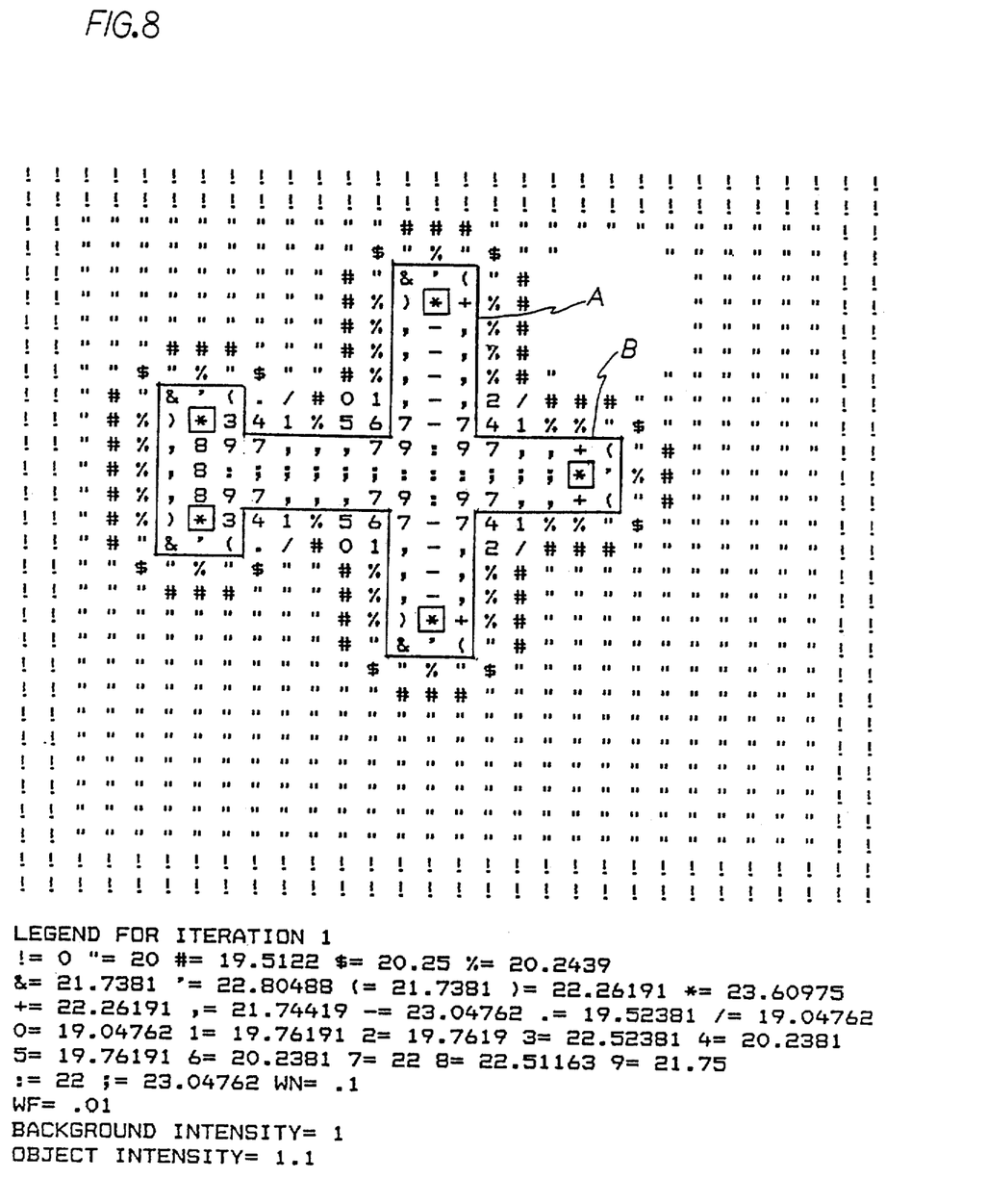

As has been previously stated, if it is desired to simulate the activity of neural systems it is often a requirement that such connectivity of both adjacent and nonadjacent processing entities, such as neurons, be considered. Differing results can occur depending on the nature of the effect of the more distant processing entities. For example, referring to the program listing and to FIG. 8 it can be seen that if the equation for ICALC at line 1100 is modified such that the term (INEAR/IFAR) appears therein instead of (INEAR+IFAR) that the maximum intensity points occur at approximately the end points of the object outline. Such information may be beneficial when it is desired to locate the maximum extent of an object outline in a field of view. In this regard, it can be appreciated that the value of WF acts in an inhibitive manner, that is, it tends to reduce the calculated value of ICALC. Such inhibitive connections between adjacent and nonadjacent populations of neurons are well known and documented and are believed to facilitate the operation of the visual nervous system.

It can be realized that a number of modifications to the method and apparatus of the invention may be envisioned by those having skill in this art. For example, the particular interconnection topology between adjacent and nonadjacent PEs may be modified in a large number of ways to provide a given result. Furthermore, the particular type of information or the nature of the weighting values and other such factors may also be varied within a large range. Still furthermore, and has been previously mentioned, the use of the invention may be advantageously employed in other than imaging systems. Thus, the scope of the present invention is not intended to be limited by the embodiments described herein, the scope of the present invention is instead to be limited only as defined by the appended claims.

APPENDIX A

```
1   REM ** SIMULATION OF PARALLEL PROCESSING ARRAY COMPRISED OF I X J
2   REM ** ROWS AND COLUMNS OF DISCREET PROCESSING ENTITIES (PEs) HAVING
3   REM ** EACH PE I,J COUPLED TO SIX IMMEDIATELY LOGICALLY ADJACENT PEs
4   REM ** AND ALSO TO FOUR LOGICALLY NONADJACENT PEs.
10  KEY OFF
20  FIRST=0
30  CLS
33  INPUT "ENTER SIZE OF ARRAY:UP TO 35";MAX$
34  MAX=VAL(MAX$)
60  DIM ARRAY(MAX,MAX)      'ARRAY HOLDS INITIAL INTENSITY VALUES
70  DIM ARRAY1(MAX,MAX)     'ARRAY1 HOLDS FINAL INTENSITY VALUES
80  DIM ARRAYWN(MAX,MAX) 'HOLDS PIXEL WN VALUES
90  DIM ARRAYWF(MAX,MAX) 'HOLDS PIXEL WF VALUES
100 DIM ARRAY2$(125)    'ARRAY2 HOLDS DISPLAYED VALUES
110 DIM ARRAY3(125)     'HOLDS RECORDED VALUES
120 DIM HOLDARRAY(MAX,MAX) 'HOLDS ORIGINAL VALUES
130 INPUT "ENTER WN: 0.000-0.999";WN$
140 WNN=VAL(WN$)
150 W=WNN
160 FOR I=1 TO MAX
170 FOR J=1 TO MAX
180 ARRAYWN(I,J)=WNN
190 NEXT J
200 NEXT I
210 INPUT "ENTER WF: 0.000-0.999";WF$
220 WFF=VAL(WF$)
230 WW=WFF
240 FOR I=1 TO MAX
250 FOR J=1 TO MAX
260 ARRAYWF(I,J)=WFF
270 NEXT J
280 NEXT I
290 INPUT "ENTER BACKROUND INTENSITY VALUE: 00.00-99.99";BACK$
300 BACK=VAL(BACK$)
310 HOLDER=33
320 FOR I=1 TO MAX
330 FOR J=1 TO MAX
340 ARRAY(I,J)=BACK
350 NEXT J
360 NEXT I
370 FOR I=1 TO 125
380 ARRAY2$(I)=CHR$(HOLDER)
390 HOLDER=HOLDER+1
391 IF HOLDER <> 127 GOTO 400
392 HOLDER=HOLDER+1 'SKIP CODE 127, NOT PRINTABLE
400 ARRAY3(I)=.0001
410 NEXT I
420 IF FIRST=0 GOTO 510
430 INPUT "CHANGE OBJECT SHAPE:Y/N";QUES$
440 IF QUES$="Y" GOTO 510
450 FOR I=1 TO MAX
460 FOR J=1 TO MAX
470 ARRAY(I,J)=HOLDARRAY(I,J)   'RESTORE ORIGINAL VALUE
480 NEXT J
490 NEXT I
500 GOTO 760
510 INPUT "ENTER ROW POSITION 1";ROW1$
520 ROW1=VAL(ROW1$)
530 INPUT "ENTER ROW POSITION 2";ROW2$
540 ROW2=VAL(ROW2$)
550 INPUT "ENTER COLUMN POSITION 1";COL1$
560 COL1=VAL(COL1$)
570 INPUT "ENTER COLUMN POSITION 2";COL2$
580 COL2=VAL(COL2$)
590 INPUT "ENTER INTENSITY: 00.00-99.99";INTT$
600 INTT=VAL(INTT$)
610 INPUT "MORE? Y/N";QUES$
620 FOR ROW=ROW1 TO ROW2
630 FOR COL=COL1 TO COL2
640 ARRAY(ROW,COL)=INTT
650 NEXT COL
660 NEXT ROW
670 IF QUES$="Y" GOTO 510
```

```
680 REM ** INTENSITY VALUES ENTERED, NOW COMPUTE
690 REM ** ICALC OVER THE ENTIRE ARRAY OF PEs **
700 REM ******************************************
710 FOR I=1 TO MAX
720 FOR J=1 TO MAX
730 HOLDARRAY(I,J)=ARRAY(I,J)
740 NEXT J
750 NEXT I
760 INPUT "ITERATIONS";IT$ 'HOW MANY ITERATIONS?
770 ITERATION=VAL(IT$)
780 FOR M=1 TO ITERATION 'START OF MAIN LOOP
790 CLS
800 PRINT "CALCULATING ITERATION";M;"OF";ITERATION
810 FOR I=1 TO MAX
820 FOR J=1 TO MAX
830 A=I-2
840 IF A<1 GOTO 1120 'EDGES OF ARRAY NOT CALCULATED
850 A=I+2
860 IF A>MAX GOTO 1120
870 A=J-2
880 IF A<1 GOTO 1120
890 A=J+2
900 IF A>MAX GOTO 1120
905 REM ** GET COORDINATES OF LOGICALLY ADJACENT AND NONADJACENT PEs
910 IMN=I-1
920 IPN=I+1
930 JMN=J-1
940 JPN=J+1
950 IMF=I-2
960 IPF=I+2
970 JMF=J-2
980 JPF=J+2
990 WNN=ARRAYWN(I,J) 'GET VALUE OF WN FOR THIS PE
995 REM **** NOW GET WEIGHTED VALUES FROM LOGICALLY ADJACENT PEs
1000 TEMPWN=WNN*(ARRAY(IMN,JMN))+WNN*(ARRAY(IMN,J))+WNN*(ARRAY(IMN,JPN))
1010 TEMPWNN=WNN*(ARRAY(I,JMN))+WNN*(ARRAY(I,JPN))
1020 TEMPWNNN=WNN*(ARRAY(IPN,JMN))+WNN*(ARRAY(IPN,J))+WNN*(ARRAY(IPN,JPN))
1030 INEAR=TEMPWN+TEMPWNN+TEMPWNNN 'SUMMATION OF LOCIGALLY ADJACENT PEs
1040 ARRAYWN(I,J)=INEAR 'SAVE IT FOR NEXT ITERATION
1050 WFF=ARRAYWF(I,J)  'GET VALUE OF WF FOR THIS PE
1055 REM ***  NOW GET WEIGHTED VALUES FROM LOGICALLY NONADJACENT PEs
1060 IFAR=WFF*(ARRAY(IMF,J))+WFF*(ARRAY(I,JPF))+WFF*(ARRAY(IPF,J))+WFF*(ARRAY(I,JMF))
1070 ARRAYWF(I,J)=IFAR 'SAVE IT
1080 REM *********** CALCULATION **************
1090 INEW=ARRAY(I,J)  ' GET RECEIVED INTENSITY VALUE FOR THIS PE
1100 ICALC=INEW*(INEAR+IFAR) 'RECEIVED INT. TIMES SUMMATION OF WEIGHTED FAR
1101 REM ******************  AND NEAR INTENSITY VALUES
1110 ARRAY1(I,J)=ICALC ' STORE RESULT IN OUTPUT ARRAY
1120 NEXT J
1130 NEXT I
1140 FOR I=1 TO MAX
1150 FOR J=1 TO MAX
1160 ARRAY(I,J)=ARRAY1(I,J) 'TRANSFER OUTPUT ARRAY TO INPUT ARRAY FOR NEXT
1165 REM ** ITERATION IF REQUIRED
1170 NEXT J
1180 NEXT I
1190 LPRINT CHR$(17);CHR$(12);CHR$(27);CHR$(69);CHR$(27);CHR$(54);
1195 REM ** SEND APPLICABLE PRINTER CODES (IBM PROPRINTER) ABOVE
1200 PLACE=1
1210 ARRAY3(1)=ARRAY1(1,1) 'INITIALIZE PLACE AND ARRAY
1220 FOR I=1 TO MAX
1230 FOR J=1 TO MAX
1240 TEMP=ARRAY1(I,J)
1250 GOSUB 1520
1260 LPRINT ARRAY2$(L);" ";
1270 IF J<MAX GOTO 1290
1280 LPRINT
1290 NEXT J
1300 NEXT I
1310 LPRINT
1320 LPRINT "LEGEND FOR ITERATION";M
1330 B=0
1340 FOR I=1 TO 125
```

```
1350 IF ARRAY3(I)=.0001 GOTO 1430
1360 LPRINT ARRAY2$(I);"=";ARRAY3(I);
1370 B=B+1
1380 IF B<5 GOTO 1410
1390 B=0
1400 LPRINT
1410 NEXT I
1420 LPRINT " "
1430 LPRINT "WN=";W
1440 LPRINT "WF=";WW
1450 LPRINT "BACKGROUND INTENSITY=";BACK
1460 LPRINT "OBJECT INTENSITY=";INTT
1470 NEXT M
1480 FIRST = 1
1490 CLS
1500 GOTO 130
1510 REM ***********************
1520 REM
1530 FOR L=1 TO 125
1540 IF TEMP=ARRAY3(L) GOTO 1590
1550 NEXT L
1560 PLACE=PLACE+1
1570 ARRAY3(PLACE)=TEMP 'STORE NEW VALUE
1580.L=PLACE
1590 RETURN 'L=LOCATION IN ARRAY3 AND CHARACTER IN ARRAY2$
```

What is claimed is:

1. A data processing system for simultaneously processing a plurality of data words, the data words being provided by means for generating data words coupled to the system for inputting data words to be processed thereto, the system comprising:

one or more data processing planes each of which comprises plurality of processing elements logically organized in rows and in columns as a two-dimensional array of processing elements, each of said processing elements comprising means for performing arithmetic and logical operations on data words in a simultaneous manner with others of said processing elements; and wherein each of said processing elements within a given plane of processing elements is operatively coupled to all processing elements within immediately adjacent rows and columns of said given plane for transferring data therebetween and is also further operatively coupled to a plurality of processing elements disposed in non-immediately adjacent rows and columns of said given plane for transferring data therebetween.

2. A data processing system as defined in claim 1 wherein said data word generating means comprises a plurality of detecting means each of which is adapted for detecting a characteristic of an environment viewed by said detecting means, each of said plurality of detecting means having an output for expressing a magnitude of the detected characteristic, each of said detecting means outputs being coupled to an input of at least one of said processing elements.

3. A data processing system as set forth in claim 1 and further comprising:

control means operatively coupled to the system for at least initiating the processing of the data words by said processing elements.

4. A data processing system as defined in claim 2 wherein each of said detecting means comprises an electromagnetic energy detecting means having an output for expressing a characteristic of electromagnetic energy incident upon said detecting means.

5. A data processing system as defined in claim 2 wherein each of said detecting means comprises an acoustic energy detecting means having an output for expressing a characteristic of acoustic energy incident upon said detecting means.

6. A data processing system as defined in claim 1 wherein each of said processing elements of one of said data processing planes is coupled to at least one other processing element in an adjacent processing plane for transferring data therebetween.

7. A data processing system as defined in claim 1 wherein a plurality of processing elements of one of said data processing planes are coupled to at least one other processing element in a nonadjacent processing plane for transferring data therebetween.

8. A parallel data processing system for simultaneously processing a plurality of data words generated by a plurality of energy sensors, each of said sensors having an output coupled to said system, comprising:

a first two-dimensional plane comprised of discreet data processing elements, each of said processing elements being coupled to a corresponding energy sensor for receiving and processing data words generated by said corresponding sensor, each of said processing elements being coupled to a plurality of logically adjacent processing elements for transferring data therebetween, each of said data processing elements further being coupled to a plurality of logically nonadjacent processing elements for transferring data therebetween.

9. A parallel data processing system as defined in claim 8 and further comprising:

a second two-dimensional plane of discreet data processing elements, a plurality of said processing elements within said second plane each being coupled to at least one of said processing elements within said first data processing plane for transferring data therebetween, the plurality of said processing elements within said second plane each further being coupled to logically adjacent processing elements within said second plane for transferring data therebetween, the plurality of said data processing elements within said second plane each further being coupled to a plurality of logically nonadjacent processing elements within said second plane for transferring data therebetween.

10. A parallel data processing system as defined in claim 9 and further comprising:
a third two-dimensional plane of discreet data processing elements, a plurality of said data processing elements within said third plane each being coupled to at least one of said processing elements within said first data processing plane for transferring data therebetween, the plurality of said processing elements within said third plane each further being coupled to at least one of said processing elements within said second plane for transferring data therebetween, the plurality of said processing elements within said third plane further being coupled to logically adjacent processing elements within said third plane for transferring data therebetween, the plurality of said data processing elements within said third plane further being coupled to a plurality of logically nonadjacent processing elements within said third plane for transferring data therebetween.

11. A method of simultaneously processing a plurality of data words with a first two-dimensional array of discreet data processing elements, individual ones of the data words being generated by individual ones of a plurality of energy sensors organized as an array of energy sensors each of which views an environment and is responsive to energy received from the environment to generate at least one data word expressive of a characteristic of the received energy, each of the energy sensors having an output signal coupled to an associated data processing element for outputting generated data words thereto, the method comprising the steps of:
receiving, with a processing element, a data word ($I_{REC}$) from a sensor, each processing element comprising means for performing at least arithmetic and/or logical operations on a data word in accordance with a stored program;
transferring at least one data word from each processing element to n logically adjacent processing elements, a transferred data word being expressive of a received sensor generated data word modified by a value of a first weighting value ($W_N$);
transferring at least one data word from each processing element to m logically nonadjacent processing elements, a transferred data word being expressive of the magnitude of a received sensor generated data word modified by a value of a second weighting value ($W_F$);
receiving at each processing element at least one data word from n logically adjacent processing elements, the received data word being expressive of a magnitude of a sensor generated data word received by logically adjacent corresponding processing elements ($I_{RECN}$) modified by the value of the first weighting value $W_N$;
receiving at each processing element at least one data word from m logically nonadjacent processing elements, the received data word being expressive of a magnitude of a sensor data word received by logically nonadjacent processing elements ($I_{RECF}$) modified by the value of the second weighting value $W_F$; and
calculating, at each processing element receiving at least one data word from adjacent and nonadjacent processing elements, a modified received sensor data word ($I_{MOD}$) in accordance with a predefined relationship between a magnitude of a data word received from a coresponding sensor $I_{REC}$ and the data words $I_{RECN}$ and $I_{RECF}$ received from n adjacent and m nonadjacent processing elements, respectively.

12. A method as defined in claim 11 where $n > m$.

13. A method as defined in claim 12 wherein the predefined relationship is $$I_{MOD} = I_{REC}\left(\sum_{1}^{n}(I_{RECN} \times W_N) + \sum_{1}^{m}(I_{RECF} \times W_F)\right).$$

14. A method as defined in claim 12 wherein the predefined relationship is $$I_{MOD} = I_{REC}\left(\sum_{1}^{n}(I_{RECN} \times W_N) / \sum_{1}^{m}(I_{RECF} \times W_F)\right).$$

15. A method as set forth in claim 11 and further comprising the step of:
transferring, from each processing element calculating a value for $I_{MOD}$, to a processing element in a second array of processing elements a data word having a value that is a function of the calculated value of $I_{MOD}$.

16. A parallel data processing system, the system having input terminals for coupling to a two-dimensional array comprised of a plurality of energy sensors each of which has an output signal for expressing a characteristic of energy received from an environment, the two-dimensional array of energy sensors being of the type wherein individual energy sensors of the array are disposed in a two-dimensional pattern wherein a given energy sensor is surrounded by physically adjacent and also by physically nonadjacent energy sensors, the system including an array comprised of a plurality of data processing elements each of which comprises input means coupled to at least one of the input terminals for receiving an output signal from at least one of the energy sensors, individual ones of said data processing elements further comprising means for coupling to a plurality n of logically adjacent data processing elements for transferring data therebetween, individual ones of said data processing elements further comprising means for coupling to a plurality m of logically nonadjacent data processing elements for transferring data therebetween, wherein data transferred between any two logically adjacent processing elements corresponds to data expressive of output signals generated by two energy sensors that are physically adjacent to one another within the two-dimensional pattern, and wherein the data transferred between any two logically nonadjacent data processing elements corresponds to data expressive of output signals generated by two energy sensors that are not physically adjacent to one another in the two-dimensional pattern, individual ones of the data processing elements each further comprising means for executing a stored program for processing an output signal received from at least one associated energy sensor to which the data processing element is coupled, the output signal being processed in conjunction with data received from n logically adjacent data processing elements and in conjunction with data received from m logically nonadjacent processing elements.

17. A system as set forth in claim 16 wherein said stored program contains instructions, the execution of instructions causing the array of data processing elements to simulate an operation of a retina having energy receptor cells coupled to adjacent and nonadjacent energy receptor cells.

18. A system as set forth in claim 16 wherein the energy is comprised of acoustic energy.

19. A system as set forth in claim 16 wherein the energy is comprised of electromagnetic energy.

20. A system as set forth in claim 16 wherein the energy is comprised of thermal energy.

* * * * *